United States Patent
Hoffmann (10) Patent No.: US 9,163,751 B2
(45) Date of Patent: Oct. 20, 2015

(54) FLOATABLE SPOOLBASE WITH INTERMEDIATE CAROUSEL STORAGE

(71) Applicant: Subsea 7 Limited, Sutton (GB)

(72) Inventor: Philippe Benoit Jacques Hoffmann, London (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 14/370,745

(22) PCT Filed: Dec. 19, 2012

(86) PCT No.: PCT/GB2012/053193
§ 371 (c)(1),
(2) Date: Jul. 3, 2014

(87) PCT Pub. No.: WO2013/102754
PCT Pub. Date: Jul. 11, 2013

(65) Prior Publication Data
US 2014/0369764 A1  Dec. 18, 2014

(30) Foreign Application Priority Data
Jan. 3, 2012  (GB) .................................. 1200028.7

(51) Int. Cl.
| B63B 35/03 | (2006.01) |
| F16L 1/20 | (2006.01) |
| B63B 27/00 | (2006.01) |
| B65H 75/42 | (2006.01) |

(52) U.S. Cl.
CPC .................. *F16L 1/203* (2013.01); *B63B 27/20* (2013.01); *B63B 35/03* (2013.01); *B65H 75/425* (2013.01)

(58) Field of Classification Search
CPC ...... B63B 27/20; B63B 35/03; B65H 75/425; F16L 1/203; F16L 1/207; F16L 1/161; F16L 9/00
USPC ........ 405/154.1, 158, 166, 167, 168.1, 168.3, 405/169, 170, 171
See application file for complete search history.

(56) References Cited

U.S. PATENT DOCUMENTS

| 3,237,438 A | 3/1966 | Tesson |
| 3,372,461 A | 3/1968 | Tesson |
| 3,639,461 A | 2/1972 | Ito et al. |
| 3,712,100 A | 1/1973 | Key et al. |
| 4,117,692 A * | 10/1978 | Oberg ........................... 405/166 |
| 6,540,440 B1 | 4/2003 | Beaujean |

(Continued)

FOREIGN PATENT DOCUMENTS

| EP | 0 302 038 | 2/1989 |
| EP | 0 909 254 | 11/1997 |
| GB | 2 439 295 | 12/2007 |
| WO | WO 96/12908 | 5/1996 |
| WO | WO 2010/052690 | 5/2010 |

*Primary Examiner* — John Kreck
*Assistant Examiner* — Carib Oquendo
(74) *Attorney, Agent, or Firm* — Levy & Grandinetti (57) ABSTRACT

A floatable spoolbase for supplying rigid pipe to a reel-lay pipelaying vessel having a storage reel with an upright rotational axis for interim storage of a continuous length of pipe is disclosed. Welding stations upstream of the storage reel add pipe elements to the pipe to be stored on the storage reel. When a pipelaying vessel visits the spoolbase, the pipe is unwound from the storage reel and fed to a pipelay reel of the pipelaying vessel. Where the pipelay reel turns about a substantially horizontal rotational axis, winding the pipe onto the pipelay reel reduces ovalization of the pipe imparted by previously winding the pipe onto the storage reel.

32 Claims, 4 Drawing Sheets

(56) References Cited

U.S. PATENT DOCUMENTS 7,544,013 B2 6/2009 Hoffmann et al.
2003/0091395 A1 5/2003 Stockstill
2010/0034591 A1 2/2010 Wilson
2010/0040417 A1 2/2010 Bursaux et al.

* cited by examiner

FLOATABLE SPOOLBASE WITH INTERMEDIATE CAROUSEL STORAGE

This invention relates to spoolbases used in support of reel-lay subsea pipelaying operations.

Reel-lay operations involve winding or spooling a continuous pipe of welded elements onto a reel of a pipelaying vessel, to be unwound or unspooled subsequently during pipelaying at sea. Fabrication and winding of the pipe typically takes place at an on-shore spoolbase that the vessel visits when necessary for loading.

A well-known method of fabricating a pipe for reel-lay operations involves welding together standard pipe joints at a spoolbase to form very long straight stalks, which may be up to one or two kilometers in length. The welds between pipe joints are tested and coated and then the resulting stalks are stored beside each other at the spoolbase, most conveniently oriented in parallel arrays, endwise to shore. When a pipelaying vessel is ready to be loaded, the stalks are welded together successively end-to-end to create a continuous length of pipe while the pipe is being wound onto the reel of the vessel.

Efficiently, stalks may be assembled and stored while a pipelaying vessel is away from the spoolbase on pipelaying operations. However, the need for welding together of successive stalks (with the related operations of weld-testing and coating) slows the winding process. This delays the return of the pipelaying vessel to productive use at sea.

In view of this problem, spoolbases have been designed to store the greatest possible continuous length of pipe that can be accommodated at the spoolbase. Any increase over a normal stalk length is advantageous to speed loading of a pipelaying vessel by reducing the number of welds between stalks. However, the ideal is for a spoolbase to manufacture and store a continuous length of pipe whose length approaches, equals or exceeds the capacity of the pipelaying vessel. In that way, it is possible for the winding process to be completed quickly with minimal welding during winding or preferably with no welding during winding at all.

Of course, increasing the continuous length of pipe held at a spoolbase will tend to increase the size of the spoolbase itself. Conventionally, a spoolbase must be built beside navigable water on a coast or on a wide river, on reasonably flat land with adequate local services that should preferably include road or rail access for personnel and supplies. In many parts of the world, such a large area of suitable land is difficult to find, if indeed it is available at all.

If straight stalks that are up to two kilometers in length are disposed end-wise to the shore, a spoolbase handling such stalks must extend a very long way inland. As it is impractical to fabricate, handle and store straight stalks that are much longer than this, and as such stalks are still too short to avoid the need for multiple welds during winding, proposals have been made to store greater lengths of welded pipe at a spoolbase in a curved carousel configuration. In this respect, nominally rigid pipes have sufficient flexibility to be bent if a minimum bend radius is observed, albeit that the minimum bend radius is typically several tens of meters. Bending may be restricted to within elastic limits or may extend into plastic deformation of the pipe that is capable of being recovered by subsequent straightening processes.

For example, EP 0909254 discloses a pipeline storage facility comprising a closed loop of rail track in a horizontal plane, with synchronised bogies distributed around the loop to receive and retain multiple turns of welded pipe in a spiral carousel arrangement. The minimum bend radius is preferably selected so as not to exceed the elastic yield limit of the pipe, hence avoiding plastic deformation. However, slight plastic deformation of the pipe is permissible with subsequent straightening. To suit a pipe of typically sixteen inches (406 mm) in diameter, the diameter of the carousel must be 300 to 400 meters or more. This still requires a large area of flat land with access to navigable water.

Another proposal, disclosed in U.S. Pat. No. 6,540,440, is known in the art by the trade mark 'O-lay'. This involves fabrication of a pipe by welding together pipe joints along a firing line situated onshore or on a barge, with the firing line axis extending offshore or off the barge to store the pipe in a spirally-wound carousel that floats flat on the water.

The fabrication site used for O-lay is not truly a spoolbase because the stored pipe is not transferred there to a visiting reel-lay vessel. Instead, once fully formed, the floating spiral carousel is towed by tugs to a laying site to be unwound progressively as the pipe is fed into and laid by a pipelaying vessel that launches the pipe to the seabed. Again, the diameter of the carousel must be 300 to 400 meters or more to minimise plastic deformation during storage of the pipe and during its transportation to a laying site.

Whilst O-lay is less demanding of land area than the other techniques discussed above, it still requires a large area of sheltered water immediately offshore to be kept for exclusive use, and a window of reasonably calm weather during the fabrication and storage process. Also, the wide floating carousel is not apt to be transported quickly or economically over great distances, particularly in high sea states.

U.S. Pat. No. 7,544,013 proposes a different solution, which also minimises land use and yet supplies welded pipe to a conventional pipelaying vessel that can deliver the pipe quickly and economically to a distant laying site. In this solution, a floating fabrication barge is moored to a quay and fabricates a pipe along a firing line extending offshore from the quay. A floating reel barge is joined by an articulated arm to the offshore end of the fabrication barge in alignment with the firing line, to store the fabricated pipe on an intermediate storage reel with a horizontal axis. The radius of the storage reel is small enough that the pipe undergoes plastic deformation on being wound onto that reel.

The stored pipe is transferred from the storage reel to a pipelaying vessel during loading, undergoing elastic deformation on being unwound from the storage reel but requiring no straightening before being wound onto a pipelay reel of the pipelaying vessel. The plastic deformation of the pipe therefore remains and in fact is increased by winding onto the pipelay reel of the pipelaying vessel, which has a smaller diameter than the storage reel.

As the weight of the storage reel will change greatly during storage and transfer operations, the barges of U.S. Pat. No. 7,544,013 have ballasting systems to adjust their buoyancy to keep them at approximately the same level in the water as each other. This is necessary for accurate and compact winding of the pipe on the storage reel. However, the independent ballasting systems of the barges and the articulated arm between them add undesirable complexity to this solution.

Also, the repeated plastic deformation of the pipe around the successive reels of U.S. Pat. No. 7,544,013 increases the ovality of the pipe in cross-section. Ovalisation increases the challenge of straightening the pipe upon laying and may irredeemably distort any liner within the pipe. If not substantially corrected during laying, ovalisation may increase the risk of the pipe collapsing or buckling when being laid or in use.

It is against this background that the present invention has been devised.

In apparatus terms, the invention resides in a water-based spoolbase for supplying rigid pipe to a reel-lay pipelaying vessel that visits the spoolbase, the spoolbase comprising at least one storage reel with an upright rotational axis for interim storage of a continuous length of pipe before its supply to a pipelay reel of the pipelaying vessel; and at least one welding station upstream of the storage reel for adding pipe elements to the pipe to be stored on the storage reel.

The spoolbase preferably has at least one pipe fabrication line comprising a linear array of welding stations operable on a series of pipe elements to assemble the pipe. In that case, where the spoolbase has an elongate deck, the or each pipe fabrication line conveniently extends along the deck and is offset to one side of the deck. Also, it is beneficial to space utilisation on the deck of the spoolbase if a firing line axis of the pipe fabrication line is outboard of the rotational axis of the storage reel. The firing line axis may, for example, be substantially aligned with a pipe support surface of the storage reel.

Where the spoolbase has an elongate deck, the rotational axis of the storage reel is preferably offset to one side of the deck. For example, the rotational axis of the storage reel may be offset to the same side of the deck as the pipe fabrication line. This also enables a pipe supply path from the storage reel to the pipelay reel of the pipelaying vessel to be disposed conveniently to a side of the storage reel nearer a longitudinal centreline of the deck.

The spoolbase preferably further comprises a storage zone for storing pipe elements before they are added to the pipe. Where the spoolbase has an elongate deck, the storage zone suitably extends along the deck and is offset to one side of the deck. For example, the storage zone may be offset to the opposite side of the deck from the fabrication line.

For simplicity of construction and ease of ballasting, all of the aforementioned structures of the invention are preferably supported by a unitary rigid body. Such a body is advantageously buoyant, in which case the body suitably has a plurality of buoyancy chambers each with variable buoyancy. It is also, or alternatively, possible for the body to be supported by the seabed under a water-based working site.

Where a spoolbase of the invention has an elongate deck, the spoolbase may, to advantage, be located side-on to a docking facility from which pipe elements are supplied. In that case, the storage zone is preferably offset to the side of the deck adjacent the docking facility. However, it is also possible for the spoolbase of the invention to be located end-on to a docking facility from which pipe elements are supplied. Indeed, it is even possible for the spoolbase to be located offshore for supply of pipe elements by sea.

The invention extends to the combination of the spoolbase of the invention with a pipelaying vessel having a pipelay reel to which pipe is supplied from the storage reel of the spoolbase. That pipelay reel preferably has a substantially horizontal rotational axis and is advantageously of smaller diameter than the storage reel of the spoolbase; for example, the diameter of the storage reel may be 1.1 to 1.3 times the diameter of the pipelay reel. Where the spoolbase has an elongate deck, the pipelaying vessel may, for example, be located at an end of the deck.

The inventive concept also embraces a method of storing rigid pipe at a water-based spoolbase for supply to a reel-lay pipelaying vessel that visits the spoolbase, the method comprising welding pipe elements to a pipe and winding the pipe onto a storage reel having an upright rotational axis.

The method of the invention suitably comprises feeding the pipe after welding to the storage reel on an axis outboard of the rotational axis of the storage reel. The pipe suitably undergoes plastic deformation on being wound onto the storage reel.

Similarly, the inventive concept encompasses a method of supplying rigid pipe from a water-based spoolbase to a reel-lay pipelaying vessel visiting the spoolbase, the method comprising unwinding the pipe from a storage reel having an upright rotational axis and feeding the pipe to a pipelay reel of the pipelaying vessel. Pipe is preferably supplied from the storage reel to the pipelaying vessel from an axis inboard of the rotational axis of the storage reel.

Plastic deformation of the pipe is preferably maintained on the pipe being unwound from the storage reel and being wound onto the pipelay reel. Indeed, plastic deformation of the pipe may be increased on being wound onto the pipelay reel.

It is advantageous that the pipelay reel turns about a substantially horizontal rotational axis such that winding the pipe onto the pipelay reel reduces ovalisation of the pipe imparted by previously winding the pipe onto the storage reel.

In order that the invention may be more readily understood, reference will now be made, by way of example, to the accompanying drawings, in which.

Figure 1:
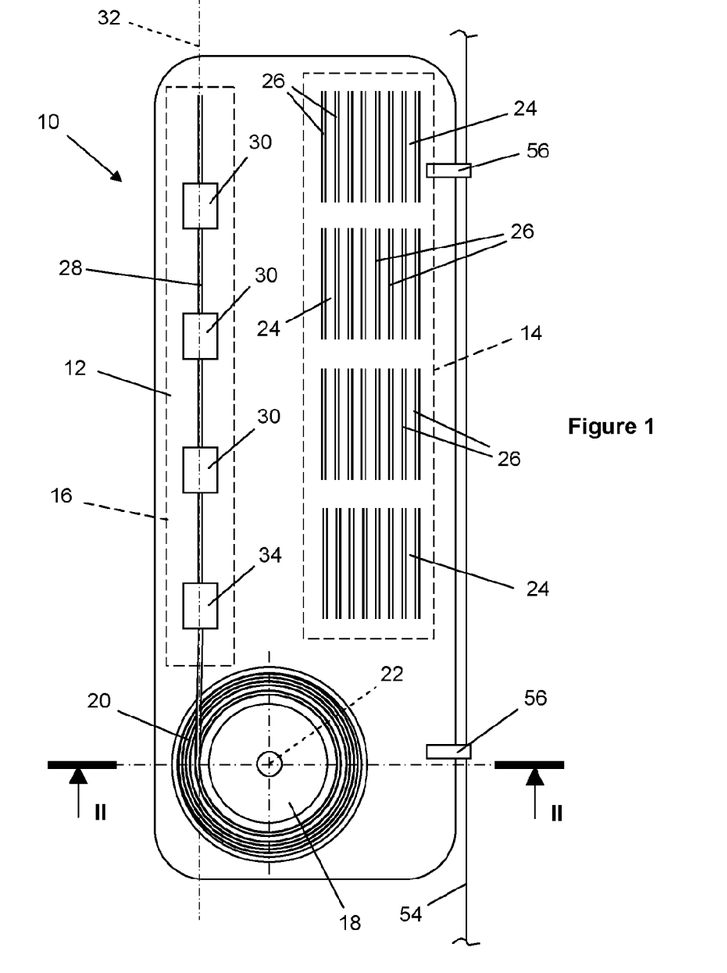
FIG. 1 is a schematic top plan view of a barge in accordance with the invention, oriented side-on to a quay and having an intermediate storage reel for winding pipe fabricated on the barge.

As best shown in FIG. 1, a barge 10 serving as a spoolbase in accordance with the invention is of generally oblong form in plan view. The ends of the barge 10 have a width of typically 40 to 60 meters and its sides have a length of typically 150 to 200 meters.

On its deck 12, the barge 10 has an elongate pipe joint storage zone 14 extending along its length on one side. An elongate pipe fabrication zone 16 extends in parallel along its length on the other side.

An intermediate storage reel 18 is disposed near an end of the deck 12. The storage reel 18 provides interim storage for a long, continuous length of rigid pipe 20 fabricated incrementally by successive welding operations in the pipe fabrication zone 16.

The storage reel 18 turns about a vertical rotational axis 22, which helpfully lowers the centre of gravity of that reel 18 compared with a reel of equivalent size turning about a horizontal axis as disclosed in U.S. Pat. No. 7,544,013. The rotational axis 22 of the storage reel 18 is offset to one side of the barge 10, to place that reel 18 at an end of the pipe fabrication zone 16.

The pipe joint storage zone 14 holds stacks 24 of double pipe joints 26 ready to be transferred individually across the barge 10 to the pipe fabrication zone 16 for fabrication by welding into pipe stalks 28. The barge 10 will typically have an on-board crane and/or conveyor facility for the purpose of transferring the double pipe joints 26 across the barge 10 from one zone 14, 16 to another but such routine details have been omitted from the drawings for clarity. Once fabricated, pipe stalks 28 are wound directly onto the storage reel 18 after being welded to the end of any pipe 20 that is already on that reel 18.

The pipe fabrication zone 16 comprises a straight-line array of three welding stations 30 along a firing-line axis 32 at which a series of four double pipe joints 26 are welded simultaneously end-to-end to form a pipe stalk 28. A coating station 34 downstream of the array of welding stations 30 applies a field joint coating to each weld region as the pipe stalk 28 advances in stepwise fashion through the coating station 34 and onto the storage reel 18.

The various welds could be tested at the welding stations 30, although one or more testing stations (not shown) could instead be disposed downstream of the welding stations 30 if required. Any suitable number of coating stations 34 can be employed; for example a dedicated coating station 34 could be disposed downstream of each welding station 30.

Figure 2:
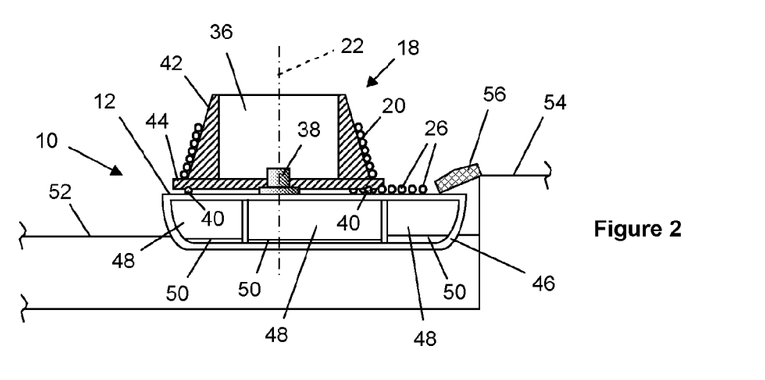
FIG. 2 is a cross-section on line II-II of FIG. 1.

As best shown in the cross-sectional view of FIG. 2, the storage reel 18 comprises a hollow body 36 that turns about a central spindle bearing 38 and is supported by roller bearings 40 between its underside and the deck 12 of the barge 10 beneath. The outer side of the body 36 presents a generally frusto-conical pipe support surface 42 that is inclined inwardly and upwardly to support successive turns of pipe 20 wound spirally on the storage reel 18. The lowermost turn of the pipe 20 is supported by a flange 44 extending outwardly from beneath the pipe support surface 42.

Whilst only one layer of turns of the pipe 20 is shown on the storage reel 18 in FIG. 2, multiple layers could be built up in outward succession. The flange 44 of the storage reel 18 can be extended outwardly to support multiple layers if needs be.

The body 36 of the storage reel 18 has a minimum diameter—at the top of its frusto-conical pipe support surface 42—of approximately 25 meters. Consequently, like U.S. Pat. No. 7,544,013 discussed above, a nominally rigid pipe 20 will undergo plastic deformation upon winding onto the storage reel 18. Some ovalisation of the pipe 20 will occur, with the pipe section flattening on an axis extending through the rotational axis 22 of the storage reel 18. In other words, the pipe section flattens from side to side and expands from top to bottom. This deformation is shown exaggeratedly in FIG. 4b, which will be discussed later.

In plan view, the firing-line axis 32 of the pipe fabrication zone 16 is aligned generally tangentially with the storage reel 18 and is disposed to the side of that reel 18 nearer to a side of the barge 10. This outboard positioning of the firing-line axis 32 makes best use of the space on the deck 12 of the barge 10, maximising the size of the pipe joint storage zone 14 to reduce land usage while leaving ample space for other equipment on the deck 12 such as cranes or other pipe-handling apparatus. Maximising the size of the pipe joint storage zone 14 also helps to trim the level of the barge 10 in the water, offsetting the concentrated weight of pipe 20 coiled on the storage reel 18 at one end of the barge 10 with the distributed weight of double pipe joints 26 stored in stacks 24 along the deck 12 of the barge 10.

In this example, the firing-line axis 32 of the pipe fabrication zone 16 is aligned tangentially with a mean radius of the frusto-conical pipe support surface 42 of the storage reel 18. This minimises the horizontal deflection necessary to coil the pipe 20 onto the storage reel 18 as successive turns of tightening radius are added. Initially, deflection will be outward to wind the lowermost turns of pipe 20 against the pipe support surface 42 and that outward deflection will lessen progressively before an increasing inward deflection begins upon winding the uppermost turns of pipe 20 against the pipe support surface 42.

During the winding process, the pipe 20 fed from the pipe fabrication zone 16 must be deflected to an increasing elevation above the deck 12 with the addition of each successive turn of the pipe 20 onto the storage reel 18. To minimise the vertical deflection of the pipe 20 that is necessary to do this, the firing-line axis 32 of the pipe fabrication zone 16 may be elevated to a mid-point of the frusto-conical pipe support surface 42 of the storage reel 18. In that case, deflection will be initially downward to wind the lowermost turns of pipe 20 and that downward deflection will lessen progressively before an increasing upward deflection begins so as to wind the uppermost turns of pipe 20.

A guide apparatus will generally be interposed between the pipe fabrication zone 16 and the storage reel 18, but such apparatus has been omitted from the drawings for clarity. The purpose of the guide apparatus is to deflect the pipe 20 appropriately on vertical and horizontal axes for tight coiling on the storage reel 18 as successive turns of pipe 20 accumulate on that reel 18.

The barge 10 has a hollow hull 46 subdivided into an array of ballast tanks or buoyancy chambers 48 extending along and across the hull 46. Three such buoyancy chambers 48 extending across the hull 46 are shown schematically in the cross-section of FIG. 2. The buoyancy of each buoyancy chamber 48 is individually adjustable by flooding them with ballast water 50 or by pumping ballast water 50 out as necessary to keep the barge 10 generally level in the sea 52 as its centre of gravity shifts along or across the deck 12 during fabrication, winding and transfer operations. Ballasting in this manner is a much simpler task than coordinating two buoyant bodies linked by an articulated coupling as proposed in U.S. Pat. No. 7,544,013.

It will be noted in this respect that the buoyancy chambers 48 shown in FIG. 2 have differing levels of ballast water 50, with the chamber 48 on the lightly-loaded right side as illustrated containing deeper ballast water 50 than the chambers 48 on the more heavily-loaded left side as illustrated, under the storage reel 18. Similar variations will be seen in different buoyancy chambers 48 along the length of the barge 10, especially as weight transfers longitudinally toward the storage reel 18 with the accumulation of successive turns of pipe 20.

FIGS. 1 and 2 show the barge 10 oriented side-on to a docking facility such as a quay 54 or wharf to which the barge 10 is moored. Articulating gangways 56 provide access from the quay 54 to the barge 10 and allow the barge 10 to move relative to the quay 54 with the tide and with changes in loading.

The quay 54 may of course have loading facilities such as roads, railways and cranes but these have been omitted from the drawings for clarity. Advantageously, if the barge 10 is oriented side-on to the quay 54, the pipe joint storage zone 14 lies beside the quay 54 as shown in FIGS. 1 and 2, for ease of loading double pipe joints 26 and other supplies onto the barge 10.

Figure 3:
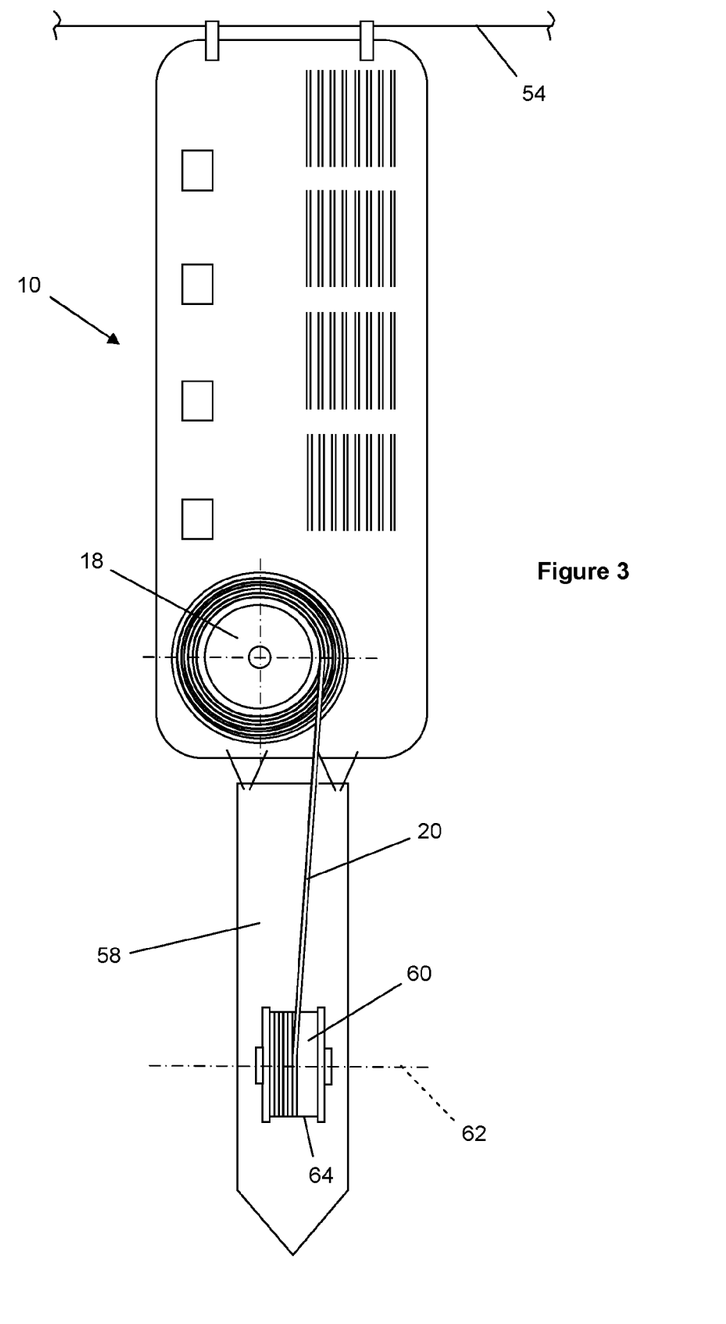
FIG. 3 is a schematic top plan view of the barge of FIG. 1, in this instance oriented end-on to a quay and in the process of transferring pipe from the storage reel to a pipelay reel of a reel-lay pipelaying vessel moored end-on to the barge.

FIG. 3 shows a reel-lay pipelaying vessel 58 being replenished with pipe 20 stored on the storage reel 18 of the barge 10, and shows how the vessel 58 is moored stern-on to the end of the barge 10 adjacent that reel 18. In FIG. 3, the barge 10 is shown in an alternative orientation end-on to a quay 54, which requires a shorter length of quay 54 and may also be advantageous to facilitate deeper-water access by the pipelaying vessel 58 moored at the offshore end of the barge 10.

Of course, if the barge 10 is instead oriented side-on to a quay 54 as shown in FIG. 1, the pipelaying vessel 58 can conveniently moor beside the quay 54 at an end of the barge 10 if the quay 54 is long enough and if a deep enough mooring is available. Alternatively, in principle, it would even be possible for the pipelaying vessel 58 to moor stern-on to the side of the barge 10 facing away from the quay 54, when the barge 10 is oriented side-on to the quay 54.

The pipelaying vessel 58 shown in FIG. 3 has a pipelay reel 60 that turns on a horizontal rotational axis 62. In a transfer operation, pipe 20 is uncoiled from the storage reel 18 of the barge 10 with elastic deformation and travels from there to be wound onto the pipelay reel 60 of the pipelaying vessel 58.

The diameter of the drum of the storage reel 18 is greater than the drum of the pipelay reel 60 of the pipelaying vessel 58. Thus, the pipelay reel 60 of the pipelaying vessel 58 has a pipe support surface 64 that is of smaller diameter than the storage reel 18 of the barge 10. The pipe 20 therefore requires no straightening on being unwound from the storage reel 18 and undergoes further plastic deformation on being wound onto the pipelay reel 60.

If the storage reel 18 has a drum diameter of say 25 meters, then the drum diameter of the pipelay reel 60 may be no more than 20 meters, for example 16 to 18 meters. More generally, the storage reel 18 has a drum diameter greater than that of the pipelay reel 60, preferably between 1.1 and 1.3 times the drum diameter of the pipelay reel 60. For example, the storage reel 18 may have a drum diameter of 25 meters and the pipelay reel 60 may have a drum diameter of 20 to 22 meters.

As the rotational axis 62 of the pipelay reel 60 is in a plane that is orthogonal to the rotational axis 22 of the storage reel 18, this further plastic deformation flattens the pipe 20 in a sense contrary to the ovalisation experienced by the pipe 20 upon winding onto the storage reel 18. In other words, the cross-section of the pipe 20 flattens on an axis extending through the horizontal rotational axis 62 of the pipelay reel 60, and so flattens from top to bottom and expands from side to side.

It will therefore be apparent that, advantageously, the second plastic deformation of the cross-section of the pipe 20 on winding it onto the pipelay reel 60 tends to correct the ovalisation that was caused by previously winding the pipe 20 onto the storage reel 18 of the barge 10.

FIGS. 4a to 4d show, in exaggerated schematic form, the deformation of the cross-section of the pipe 20 through these various stages.

Figure 4A:
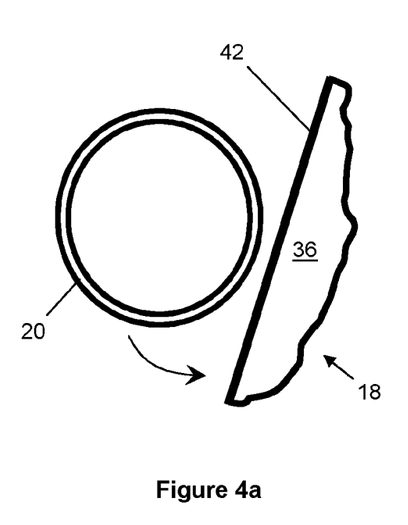
FIGS. 4*a* to 4*d* are a sequence of schematic cross-sectional views showing the pipe deforming before and after winding onto the storage reel and before and after winding onto the pipelay reel.
Figure 4B:
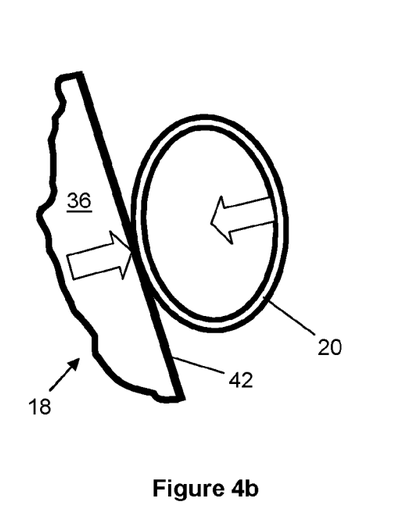

Initially, as shown in FIG. 4a, the cross-section of the pipe 20 is substantially circular when travelling from pipe fabrication zone 16 to approach the pipe support surface 42 of the body 36 of the storage reel 18. Then, the cross-section of the pipe 20 becomes elliptical due to plastic deformation upon winding onto the body 36 of the storage reel 18, with a long axis of the ellipse being nearly parallel to the vertical rotational axis 22 of that reel 18. This ovalisation is shown in FIG. 4b, which is viewed from the other side of the storage reel 18.

Figure 4C:
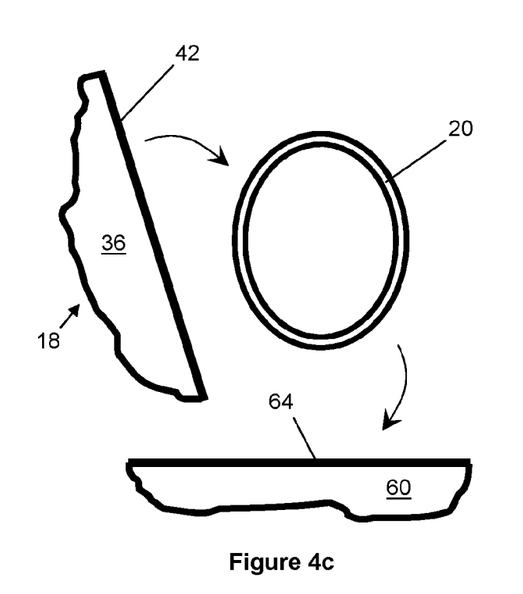
Figure 4D:
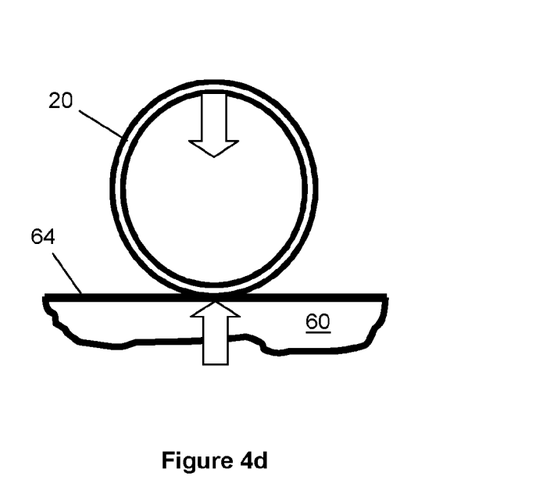

As shown in FIG. 4c, the cross-section of the pipe 20 remains nearly as elliptical in transit to the pipelay reel 60 of the pipelaying vessel 58, allowing for recovery of some elastic deformation on unwinding. Then, as shown in FIG. 4d, the cross-section of the pipe 20 returns to near-circular due to plastic deformation upon winding onto the pipe support surface 64 of the pipelay reel 60 with its horizontal rotational axis 62.

Again, a guide apparatus will generally be interposed between the storage reel 18 of the barge 10 and the pipelay reel 60 of the pipelaying vessel 58 to deflect the pipe 20 appropriately for coiling on the pipelay reel 60. As before, such apparatus has been omitted from the drawings for clarity.

FIG. 3 also shows that the pipe 20 is unwound from the inboard side of the intermediate storage reel 18, closer to the longitudinal centreline of the barge 10. This location is conveniently central with respect to the width of the barge 10. Thus, the pipelaying vessel 58 can moor centrally to an end of the barge 10 and the pipe 20 can be transferred from the storage reel 18 of the barge 10 to the pipelay reel 60 of the vessel 58 with minimal lateral deflection.

Once its pipelay reel 60 has been replenished with a suitable length of pipe 20, the pipelaying vessel 58 can depart to a pipelay location. There, the pipe 20 is paid out from the pipelay reel 60, straightened, launched from the pipelaying vessel 58 and laid on the seabed using well-known techniques that require no elaboration here. Meanwhile the barge 10 can resume production and storage of pipe 20 ready for replenishing the pipelaying vessel 58 on its return, or for replenishing another pipelaying vessel operating in the area.

The barge 10 is a largely self-contained pipe production and buffer storage facility that can be towed to different locations in accordance with local pipelaying demand and other commercial requirements. For example, it may be commercially attractive to offer employment to a local workforce, which indeed may be a condition of a pipelaying contract. The barge 10 can be used at non-specialised port locations that require minimal land area to be reserved for pipe joint supply, storage or preliminary processing. Also, those locations need only have access to shallow water as the length of the barge 10 can be exploited in end-on orientation to access deeper water for mooring pipelaying vessels with a large draft.

Many variations are possible within the inventive concept. For example, to increase storage capacity, the barge 10 may have more than one storage reel 18 on its deck 12. Two or more reels 18 can be fed from one or more firing lines, and can be spaced apart on the deck 12 to aid trimming of the barge 10.

It would of course be possible to moor the barge 10 beside a floating pontoon instead of a quay 54, to eliminate relative tidal movement. It would also be possible to moor the barge 10 in a sheltered area away from land with sufficient draft for a pipelaying vessel 58 to come alongside, in which case the barge 10 can be supplied by sea.

Whilst it is advantageous for the barge 10 to be floatable for waterborne mobility, it is not essential for the barge 10 to float once it is operational at a chosen water-based site. For example, where used in sufficiently shallow water, the barge 10 could be designed to be lowered onto the seabed while its deck 12 remains above the surface. It is also possible for the barge 10 to have legs that can be jacked onto the seabed to support and level the barge 10 instead of relying entirely on buoyancy chambers 48 in the hull 46 to stabilise and trim the barge 10. It is also possible for the barge 10 to be self-propelled if it is fitted with engines and suitable propulsion apparatus such as thrusters.

The storage reel 18 of the barge 10 could be partitioned to store different pipe diameters separately and then to unspool them onto the pipelay reel 60, which can also be partitioned. This makes it possible to fabricate different pipes on the spoolbase and to store them on the storage reel 18 in a way that will be different to the storage on the pipelay reel 60 on the pipelaying vessel 58. This makes the system of the invention more flexible.

The pipe stalks 28 could be returned after fabrication to the pipe joint storage zone 14 for storage before a winding operation, whereupon the pipe stalks 28 may be transferred back to the pipe fabrication zone 16 when they are to be welded onto the pipe 20 and wound onto the storage reel 18. Some pipe preparation and fabrication steps such as lining the pipe joints can be performed on land if required, whether beside the barge 10 or otherwise.

It is also possible to perform other pipe preparation and fabrication steps on the spoolbase barge, such as welding together single pipe joints to form the double pipe joints 26. In this respect, FIG. 5 of the drawings shows another embodiment of the invention in which like numerals are used for like parts. In the embodiment shown in FIG. 5, a barge 66 has parallel preliminary fabrication zones 68, 70 that extend along the length of the barge 66 and lie between the pipe storage zone 14 and the pipe fabrication zone 16, which are counterparts of the corresponding zones in the preceding embodiment.

Figure 5:
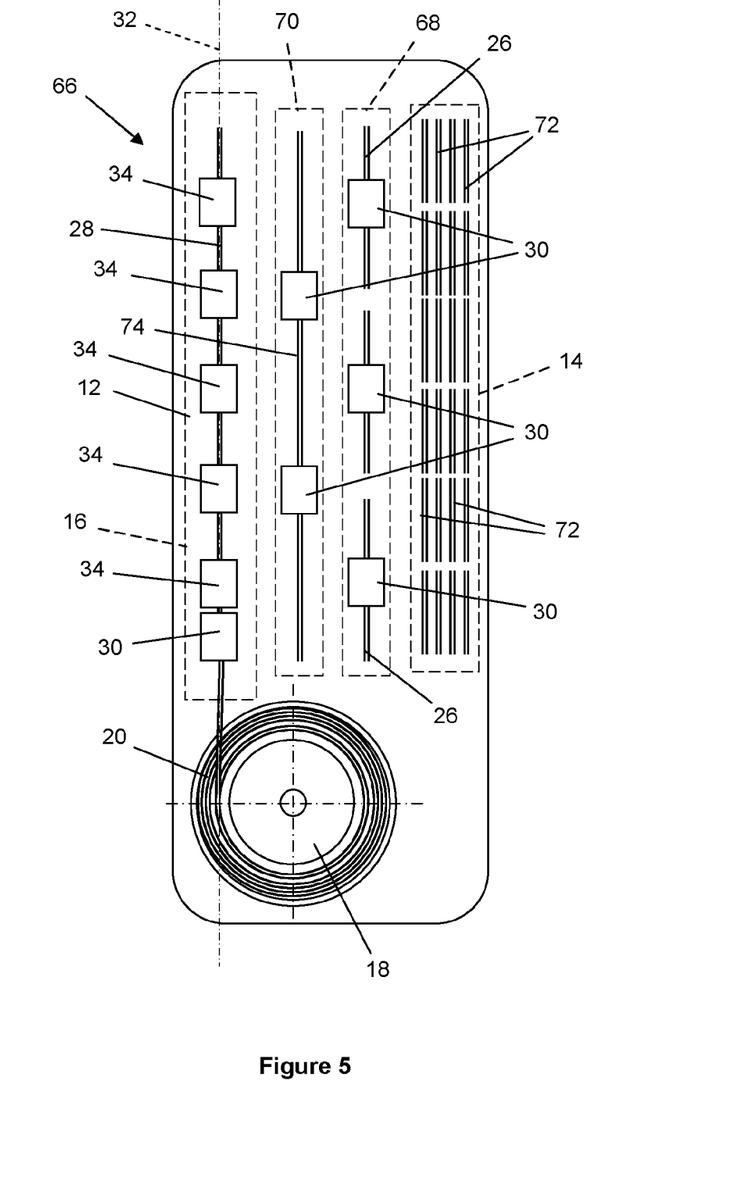
FIG. 5 is a schematic top plan view of a further embodiment of the invention in which a barge has preliminary fabrication zones for assembling pipe stalks.

A first preliminary fabrication zone 68 to the opposite side of the barge 66 from the pipe fabrication zone 16 receives single joints 72 of pipe, each being typically of twelve meters in length. In this example, the first preliminary fabrication zone 68 has three welding stations 30, each of which welds together two single joints 72 to form one double joint 26 of twenty-four meters in length. The first preliminary fabrication zone 68 therefore produces three double joints 26 in alignment with each other, that can be welded together subsequently in the second preliminary fabrication zone 70.

Using two welding stations 30 to join the three double joints 26, the second preliminary fabrication zone 70 prepares a sextuple joint 74 of seventy-two meters in length. The sextuple joint 74 is then moved onto the firing line axis 32 in the pipe fabrication zone 16, which in this example has only one welding station 30 and five field joint coating stations 34 aligned along the firing line axis 32. Fewer coating stations 34, such as three coating stations 34, may be provided in the pipe fabrication zone 16; conversely, other coating stations 34 may be provided in either or both of the preliminary fabrication zones 68, 70 but these have been omitted from FIG. 5 for clarity.

The arrangement shown in FIG. 5 reduces the cycle time and allows a stalk of seventy-two metres in length to be spooled in one operation onto the storage reel 18.

Of course, a longer stalk could be produced and spooled by increasing the number of welding stations 30 and coating stations 34. For example, there could be four welding stations 30 in the first preliminary fabrication zone 68 to produce four double joints 26 from eight single joints 72. In that case, the second preliminary fabrication zone 70 will have three welding stations to weld together the four double joints 26 to form a stalk—or an octuple joint—that is ninety-six metres in length. There will again be one welding station 30 in the pipe fabrication zone 16 to weld the stalk to the pipe 20 already on the storage reel 18, but in this example there will generally be more coating stations 34 in the pipe fabrication zone 16.

Conveniently, welding may be performed simultaneously at all welding stations 30 of the first preliminary fabrication zone 68 and in the next step, at all welding stations 30 of the second preliminary fabrication zone 70. Similarly, field joint coating can be performed simultaneously at all coating stations 34 on the firing line in the pipe fabrication zone 16.

The invention claimed is:

1. A water-based spoolbase for supplying rigid pipe to a reel-lay pipelaying vessel that visits the water-based spoolbase, the water-based spoolbase comprising at least one storage reel with an upright rotational axis for interim storage of a continuous length of pipe before its supply to a pipelay reel of the pipelaying vessel; and at least one welding station upstream of the at least one storage reel for adding pipe elements to the pipe to be stored on the at least one storage reel and having a unitary rigid buoyant body supporting the storage reel and the welding station.

2. The water-based spoolbase of claim 1 having a pipe fabrication line comprising a linear array of welding stations operable on a series of pipe elements to assemble the pipe.

3. The water-based spoolbase of claim 2 having an elongate deck, wherein the pipe fabrication line extends along the elongate deck and is offset to one side of the elongate deck.

4. The water-based spoolbase of claim 2, wherein a firing line axis of the pipe fabrication line is outboard of the rotational axis of the storage reel.

5. The water-based spoolbase of claim 4, wherein the firing line axis is aligned with a pipe support surface of the storage reel.

6. The water-based spoolbase of claim 1 having an elongate deck, wherein the rotational axis of the at least one storage reel is offset to one side of the elongate deck.

7. The water-based spoolbase of claim 6 having a pipe fabrication line comprising a linear array of welding stations operable on a series of pipe elements to assemble the pipe, wherein: the pipe fabrication line extends along the elongate deck and is offset to one side of the elongate deck; and the rotational axis of the storage reel is offset to the same side of the elongate deck as the pipe fabrication line.

8. The water-based spoolbase of claim 6 having a pipe supply path from the at least one storage reel to the pipelay reel of the pipelaying vessel, which path is disposed to a side of the at least one storage reel nearer a longitudinal centreline of the elongate deck.

9. The water-based spoolbase of claim 1, further comprising a storage zone for storing pipe elements before they are added to the pipe.

10. The water-based spoolbase of claim 9 comprising an elongate deck, wherein the storage zone extends along the deck and is offset to one side of the elongate deck.

11. The water-based spoolbase of claim 10 having a pipe fabrication line comprising a linear array of welding stations operable on a series of pipe elements to assemble the pipe, wherein: the pipe fabrication line extends along the elongate deck and is offset to one side of the elongate deck; and the storage zone is offset to an opposite side of the elongate deck from the pipe fabrication line.

12. The water-based spoolbase of claim 1, and has a plurality of buoyancy chambers each with variable buoyancy.

13. The water-based spoolbase of claim 1, wherein the unitary rigid body is arranged to be supported by a seabed under a water-based working site.

14. The water-based spoolbase of claim 1 having an elongate deck, when located side-on to a docking facility from which pipe elements are supplied to the water-based spoolbase.

15. The water-based spoolbase of claim 14 having a storage zone for storing pipe elements before they are added to the pipe, which storage zone extends along the elongate deck and is offset to one side of the elongate deck adjacent the docking facility.

16. The water-based spoolbase of claim 1 having an elongate deck, when located end-on to a docking facility from which pipe elements are supplied to the water-based spoolbase.

17. The water-based spoolbase of claim 1, wherein the pipelaying vessel has a pipelay reel for receiving pipe supplied from the at least one storage reel of the water-based spoolbase.

18. The water-based spoolbase of claim 17, wherein the water-based spoolbase has an elongate deck and the pipelaying vessel is located at an end of the elongate deck.

19. The water-based spoolbase claim 17, wherein the pipelay reel of the pipelaying vessel has a horizontal rotational axis.

20. The water-based spoolbase claim 17, wherein the pipelay reel of the pipelaying vessel has a diameter, the diameter of the pipelay reel being smaller than the storage reel of the water-based spoolbase.

21. The water-based spoolbase of claim 20, wherein the storage reel has a diameter of 1.1 to 1.3 times the diameter of the pipelay reel.

22. A method of storing rigid pipe at a water-based spoolbase for supply to a reel-lay pipelaying vessel that visits the water-based spoolbase, the water-based spoolbase having a unitary rigid buoyant body supporting a storage reel and a welding station upstream of the storage reel, the method comprising welding pipe elements to a pipe and winding the pipe onto the storage reel, which storage reel has an upright rotational axis.

23. The method of claim 22, comprising feeding the pipe after welding to the storage reel on an axis outboard of the upright rotational axis of the storage reel.

24. The method of claim 22, wherein the water-based spoolbase is located at a docking facility from which pipe elements are supplied to the water-based spoolbase.

25. The method of claim 22, wherein the water-based spoolbase is located offshore for supply of pipe elements to the water-based spoolbase by sea.

26. The method of claim 22, wherein the pipe undergoes plastic deformation on being wound onto the storage reel.

27. The method of claim 22, being performed when the water-based spoolbase floats on the water.

28. A method of supplying rigid pipe from a water-based spoolbase to a reel-lay pipelaying vessel visiting the water-based spoolbase, the water-based spoolbase having a unitary rigid buoyant body supporting a storage reel and a welding station upstream of the storage reel, the method comprising unwinding the pipe from the storage reel, which storage reel has an upright rotational axis and feeding the pipe to a pipelay reel of the pipelaying vessel, wherein the pipelay reel turns about a horizontal rotational axis such that winding the pipe onto the pipelay reel reduces ovalisation of the pipe imparted by previously winding the pipe onto the storage reel.

29. The method of claim 28, comprising supplying the pipe from the storage reel to the pipelaying vessel from an axis inboard of the upright rotational axis of the storage reel.

30. The method of claim 28, comprising maintaining plastic deformation of the pipe on being unwound from the storage reel and being wound onto the pipelay reel.

31. The method of claim 30, comprising increasing plastic deformation of the pipe on being wound onto the pipelay reel.

32. The method of claim 28, being performed when the water-based spoolbase floats on the water.

* * * * *